(No Model.) 2 Sheets—Sheet 1.

L. KUHNER.
INCUBATOR.

No. 514,084. Patented Feb. 6, 1894.

ATTEST
Helen Graham
William Graham

INVENTOR
LOUIS KUHNER
by his attorney
L. P. Graham (No Model.)

L. KUHNER.
INCUBATOR.

No. 514,084. Patented Feb. 6, 1894.

ATTEST
Helen Graham
William Graham

INVENTOR
Louis Kuhner.
by his attorney
L. P. Graham

UNITED STATES PATENT OFFICE.

LOUIS KUHNER, OF DECATUR, ILLINOIS.

INCUBATOR.

SPECIFICATION forming part of Letters Patent No. 514,084, dated February 6, 1894.

Application filed March 1, 1893. Serial No. 464,177. (No model.)

*To all whom it may concern:*

Be it known that I, LOUIS KUHNER, of Decatur, in the county of Macon and State of Illinois, have invented certain new and useful Improvements in Incubators, of which the following is a specification.

This invention relates in part to the heating mechanism, and in part to the egg turning mechanism of incubators, and it is embodied in the details of construction and combinations of parts hereinafter set forth and claimed.

Figure 1:
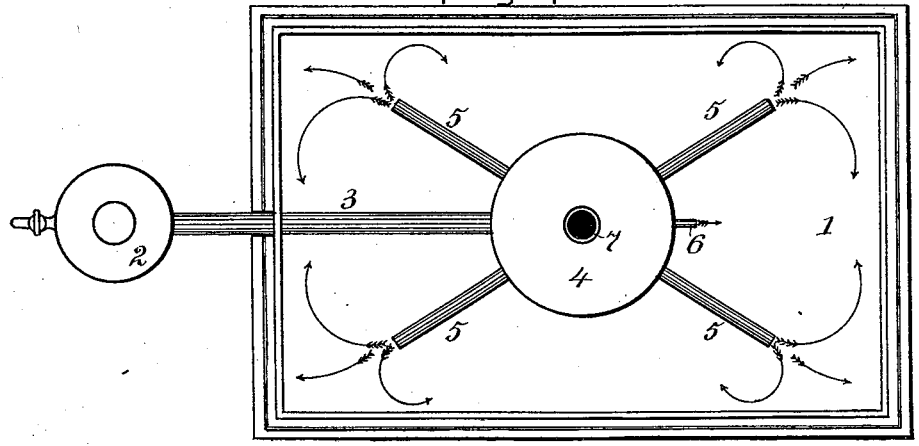
Figure 2:
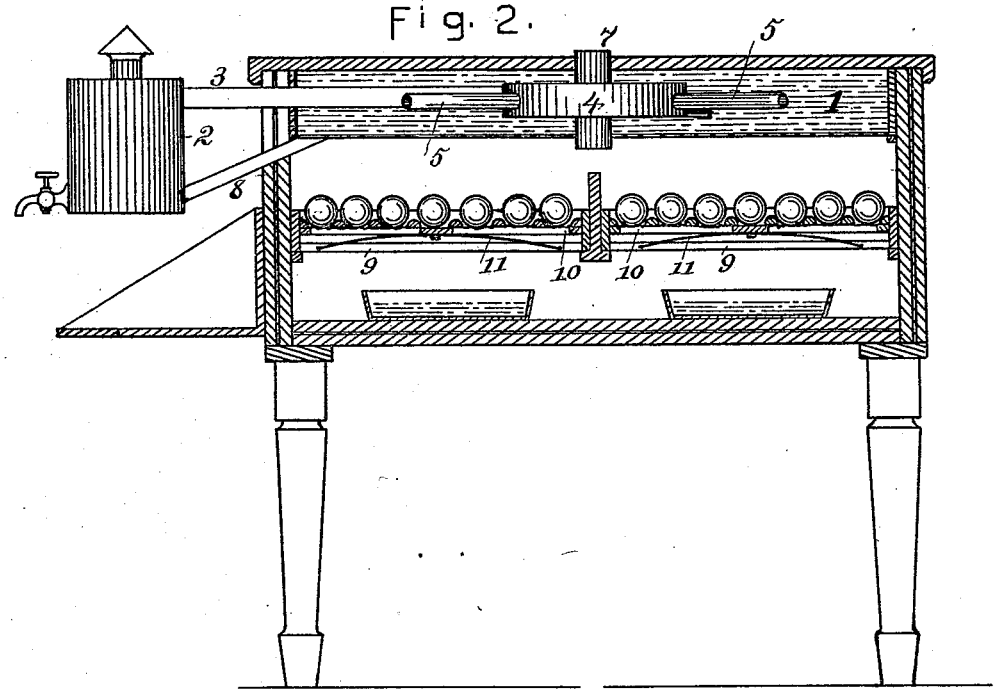
Figure 3:
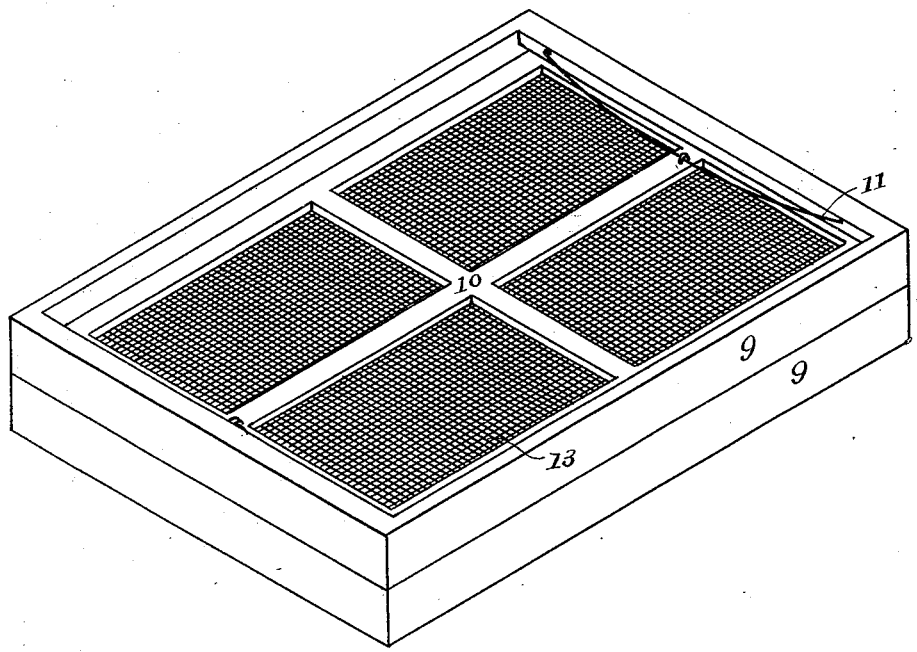
Figure 4:
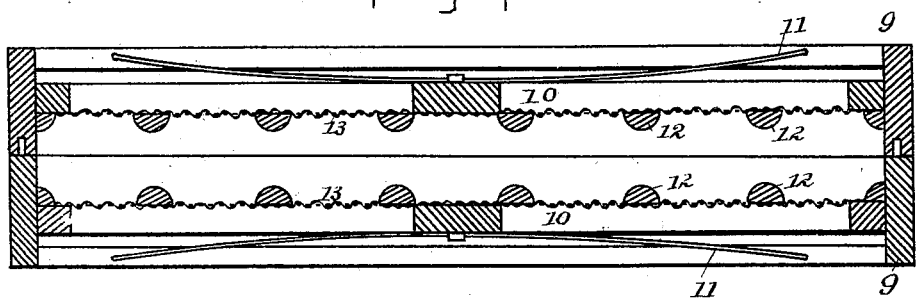

In the drawings forming part of this specification Figure 1 is a plan of the heating tank with necessary adjuncts. Fig. 2 is a central vertical section lengthwise of the incubator. Fig. 3 is a perspective representation of the egg turning device. Fig. 4 is a vertical transverse section through the egg turning device on any line intermediate the center and an end.

The incubator, with the exceptions hereinafter mentioned, is constructed in any desirable manner, although it is of course desirable to produce an effective hatcher in as simple and as economical a manner as possible. The water tank is shown at 1. A hot water boiler, outside the incubator casing, is shown at 2. The hot water feed pipe is shown at 3. At 4 is shown a hot water reservoir submerged in the tank, at or near the center thereof. At 5 is seen hot water distributing pipes radiating from the reservoir. The pipe 6 is used to discharge the water from the reservoir, when such proceeding is necessary, and it is so small as to have little or no effect on the circulation of the water. At 7 is seen a ventilating pipe extending through the reservoir and into the egg chamber. The pipe 8 connects the tank 1 with the boiler 2 and completes the circulation of the water heated in such jacket.

The mechanism, so far as described, is designed to heat the egg chamber, and its operation is as follows: A lamp, or other heater is placed under the jacket, and the water therein is brought to the desired temperature and transmitted to the reservoir at the center of the tank. From the reservoir the water is distributed radially to the different corners of the tank, and finally returned to the boiler to be reheated. The effect of the operation is that the heat is maintained equably throughout the tank and imparted to the eggs in the egg chamber in such manner that all will hatch uniformly, and with superior results.

The egg drawer is composed of the drawer proper, 9, two of such drawers being ordinarily used in an incubator and a third held in reserve for the purpose hereinafter explained, and in each drawer is an egg holder 10, having more or less vertical play in the drawer and provided with a wire cloth bottom 13, and slats 12, which separate tiers of eggs. Each holder is provided with a spring as 11, the ends of which turn at right angles and enter holes in the end of the drawer, and, which ordinarily sustains the holder in its highest possible position. These springs are ineffective so long as the eggs require no turning, but when it becomes necessary to turn the eggs, the drawer is withdrawn from the incubator, and the reserve drawer hereinbefore mentioned is placed on top, as indicated in Fig. 4 of the drawings, and the two drawers so placed are inverted and separated, and the original surplus drawer placed with the eggs into the incubator. This leaves another surplus drawer which is used again in the manner described, and so the operation continues. As the drawers are placed together on opposite sides of the inclosed eggs, the springs yield to accommodate different sized eggs, so preventing breakage, and as a result of the turning operation each egg is turned precisely half way over, or given a semi-rotation, whatever may be its diameter or condition.

Having thus described my invention, I claim as new, and desire to secure by Letters Patent—

1. In incubators, the combination of a water tank, a reservoir inclosed within the tank in a manner to permit its being entirely surrounded by the contents of the tank, a heat boiler outside the tank, a pipe leading from the boiler to the reservoir, circulating pipes radiating from the reservoir and communicating with the tank, and a pipe connecting the tank with the boiler, substantially as set forth.

2. The combination of the egg drawer 9, the egg holder 10 having the wire cloth bottom and the cross slats and adapted to move vertically in the drawer, and the spring rods 11 connected at their ends with the drawer and at their centers with the holder, substantially as set forth.

In testimony whereof I sign my name in the presence of two subscribing witnesses.

LOUIS KUHNER.

Attest:
    E. S. McDONALD,
    L. P. GRAHAM.